(12) United States Patent
Oulachgar

(10) Patent No.: US 11,187,590 B2
(45) Date of Patent: Nov. 30, 2021

(54) MICROBOLOMETER DETECTORS AND ARRAYS FOR PRINTED PHOTONICS APPLICATIONS

(71) Applicant: INSTITUT NATIONAL D'OPTIQUE, Quebec (CA)

(72) Inventor: Hassane Oulachgar, Quebec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 134 days.

(21) Appl. No.: 16/681,602

(22) Filed: Nov. 12, 2019

(65) Prior Publication Data

US 2020/0149973 A1 May 14, 2020

Related U.S. Application Data

(60) Provisional application No. 62/760,484, filed on Nov. 13, 2018.

(51) Int. Cl.
*G01J 5/22* (2006.01)
*G01J 5/02* (2006.01)
(Continued)

(52) U.S. Cl.
CPC ............ *G01J 5/22* (2013.01); *G01J 5/023* (2013.01); *G01J 5/045* (2013.01); *G01J 5/046* (2013.01);
(Continued)

(58) Field of Classification Search
CPC .. G01J 5/22; G01J 5/046; G01J 5/0853; G01J 5/20
See application file for complete search history.

(56) References Cited

U.S. PATENT DOCUMENTS 6,697,694 B2 2/2004 Mogensen
7,625,117 B2 12/2009 Haslett et al.
(Continued)

FOREIGN PATENT DOCUMENTS

JP 2013-231714 * 11/2013
WO PCT/EP2009/052646 * 9/2009

OTHER PUBLICATIONS

JP 2013-231714 Machine Translation (Year: 2013).*
(Continued)

*Primary Examiner* — David P Porta
(74) *Attorney, Agent, or Firm* — Hickman Becker Bingham Ledesma LLP

(57) ABSTRACT

Microbolometer detectors and arrays fabricated using printed electronics and photonics techniques, including ink-based printing, are disclosed. A microbolometer detector can include a substrate, a platform suspended above the substrate, and a thermistor printed on the platform and made of a thermistor material including an electrically conducting polymer, for example a poly(3,4-ethylenedioxythiophene) polystyrene sulfonate (PEDOT:PSS) polymeric composition. The microbolometer detector can also include an electrode structure electrically connected to the thermistor, and an ohmic contact layer interposed between the thermistor and the electrode structure. The electrode structure can be made of an electrode material including silver, while the ohmic contact layer can be made of an ohmic contact material including a PEDOT-carbon nanotube polymeric composition. A microbolometer array can include a plurality of microbolometer detectors arranged in a linear or two-dimensional matrix.

21 Claims, 12 Drawing Sheets

(51) Int. Cl.
G01J 5/04 (2006.01)
G01J 5/08 (2006.01)
G01J 5/20 (2006.01)

(52) U.S. Cl.
CPC .............. *G01J 5/0853* (2013.01); *G01J 5/20* (2013.01); *G01J 2005/202* (2013.01)

(56) References Cited

U.S. PATENT DOCUMENTS

| | | | |
|---|---|---|---|
| 8,507,865 | B2 | 8/2013 | Boberl et al. |
| 9,029,180 | B2 | 5/2015 | Britton et al. |
| 9,587,978 | B2* | 3/2017 | Okudo .................. G01J 1/0407 |
| 2006/0061454 | A1 | 3/2006 | Debord et al. |
| 2007/0147473 | A1 | 6/2007 | Wolkin et al. |
| 2009/0266988 | A1* | 10/2009 | Honda ................ H01L 31/0203 |
| | | | 250/353 |
| 2010/0274447 | A1 | 10/2010 | Stumpf |
| 2010/0294936 | A1 | 11/2010 | Boberl et al. |
| 2013/0026596 | A1* | 1/2013 | Lapadatu .......... H01L 27/14683 |
| | | | 257/467 |
| 2014/0110695 | A1 | 4/2014 | Benwadih |
| 2014/0121557 | A1 | 5/2014 | Gannon et al. |
| 2016/0178444 | A1* | 6/2016 | Oulachgar ................ G01J 3/36 |
| | | | 250/349 |
| 2016/0219196 | A1 | 7/2016 | Verilhac |

OTHER PUBLICATIONS

Kwon, Il Woong, Son, Hyuck Jun, Kim, Woo Young, et al. "Thermistor behavior of PEDOT:PSS thin film. Synthetic metals", 2009, vol. 159, No. 12, p. 1174-1177.

Honda, Wataru, Harada, Shingo, Arie, Takayuki, et al. "Printed wearable temperature sensor for health monitoring". In : Sensors, 2014 IEEE. IEEE, 2014. p. 2227-2229.

Daoud, Walid A., Xin, John H., et Szeto, Yau S. "Polyethylenedioxythiophene coatings for humidity, temperature and strain sensing polyamide fibers" Sensors and Actuators B: Chemical, 2005, vol. 109, No. 2, p. 329-333.

Son, Hyeok Jun, Kwon, Il Woong, Lee, Yong Soo, et al. "Poly (3, 4-ethylenedioxythiophene): poly(styrenesulfonate) (PEDOT: PSS) films for the microbolometer applications". IEICE transactions on electronics, 2009, vol. E92_C, No. 5, p. 702-707.

Son, Hyeok Jun, Kwon, Il Woong, et Lee, Hee Chul. "Passivation effect for the reduction of 1/f noise in poly (3, 4-ethylenedioxythiophene): Poly(styrene sulfonate) thin films based on uncooled type microbolometer applications". Applied Physics Express, 2009, vol. 2, No. 4, p. 041501.

Meskers, Stefan C.J., Van Duren, Jeroen K.J., Janssen, René A.J., et al. "Infrared Detectors with Poly (3, 4-ethylenedioxythiophene)/Poly(styrene sulfonic acid)(PEDOT/PSS) as the Active Material". Advanced Materials, 2003, vol.15, No. 7-8, p. 613-616.

Mattana, Giorgio et Briand, Danick. "Recent advances in printed sensors on foil". Materials Today, 2016, vol. 19, No. 2, p. 88-99.

Liao, Chien-Jen et Su, Guo-Dung. "CMOS compatible IR sensors by cytochrome c protein". In : Infrared Sensors, Devices, and Applications III. International Society for Optics and Photonics, 2013. p. 88680F.

Liang, Shuo-Feng, Yen, Po-Hsien, et Su, Guo-Dung John. "An infrared sensor by inkjet printed cytochrome c protein with CMOS readout circuits". In : Infrared Remote Sensing and Instrumentation XXIV. International Society for Optics and Photonics, 2016. p. 997305.

Vuorinen, Tiina, Niittynen, Juha, Kankkunen, Timo, et al. "Inkjet-printed graphene/PEDOT:PSS temperature sensors on a skin-conformable polyurethane substrate". Scientific reports, 2016, vol. 6, p. 35289.

Gohier, Aurelien, Dhar, Anirban, Gorintin, Louis, et al. "All-printed infrared sensor based on multiwalled carbon nanotubes". Applied Physics Letters, 2011, vol. 98, No. 6, p. 063103.

Bali, C., Brandlmaier, A., Ganster, A., et al. "Fully inkjet-printed flexible temperature sensors based on carbon and PEDOT:PSS". Materials Today: Proceedings, 2016, vol. 3, No. 3, p. 739-745.

Kuş, Mahmut et Okur, Salih. "Electrical characterization of PEDOT:PSS beyond humidity saturation". Sensors and Actuators B: Chemical, 2009, vol. 143, No. 1, p. 177-181.

Grace, Roger H. "Printable/Flexible Sensors: Valuable Additions to the Designer's Toolkit". Sensor Magazin, vol. 3, 2015, pp. 32-34.

Wang, Chin-Tsan, Huang, Kuo-Yi, Lin, David TW, et al. "A flexible proximity sensor fully fabricated by inkjet printing". Sensors, 2010, vol. 10, No. 5, p. 5054-5062.

* cited by examiner

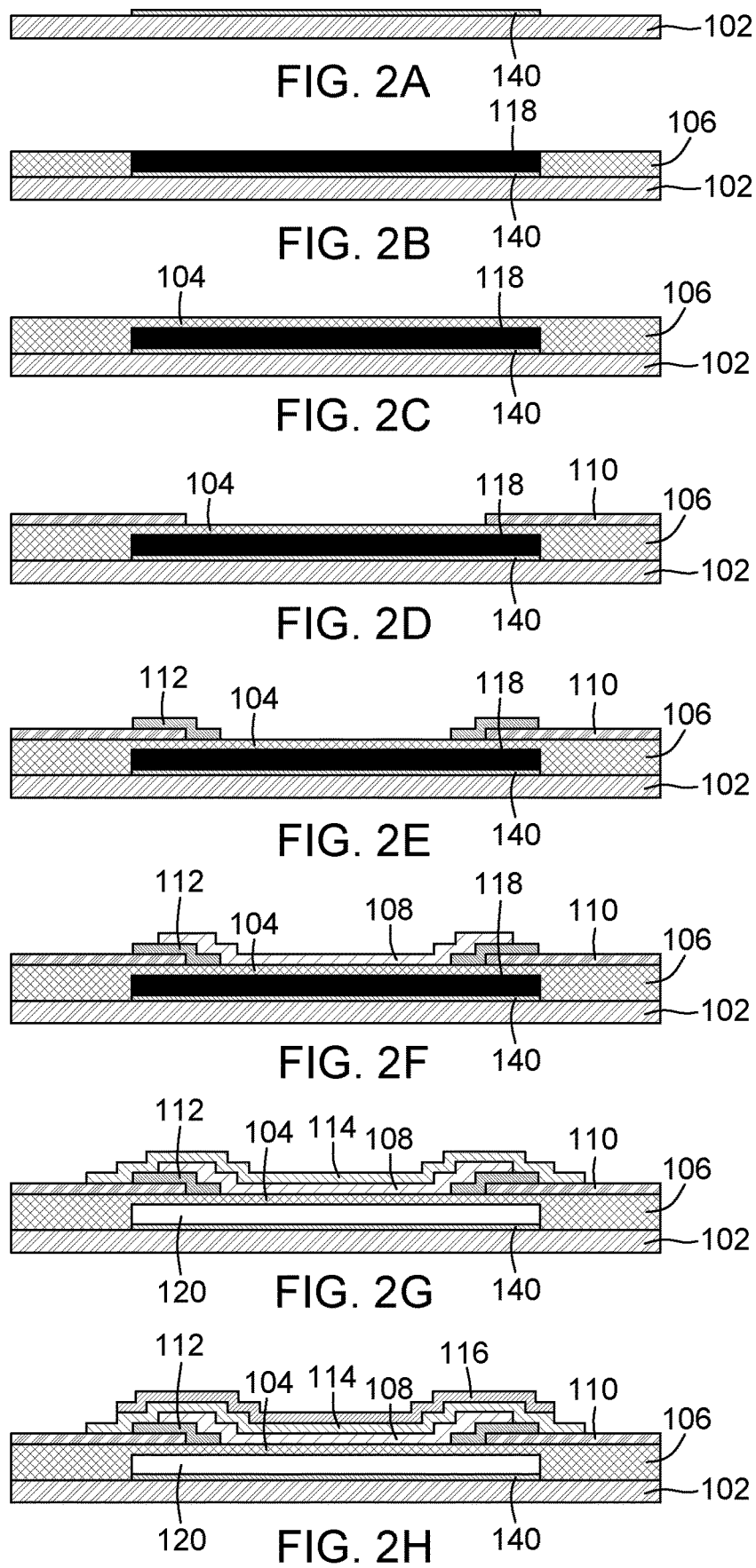

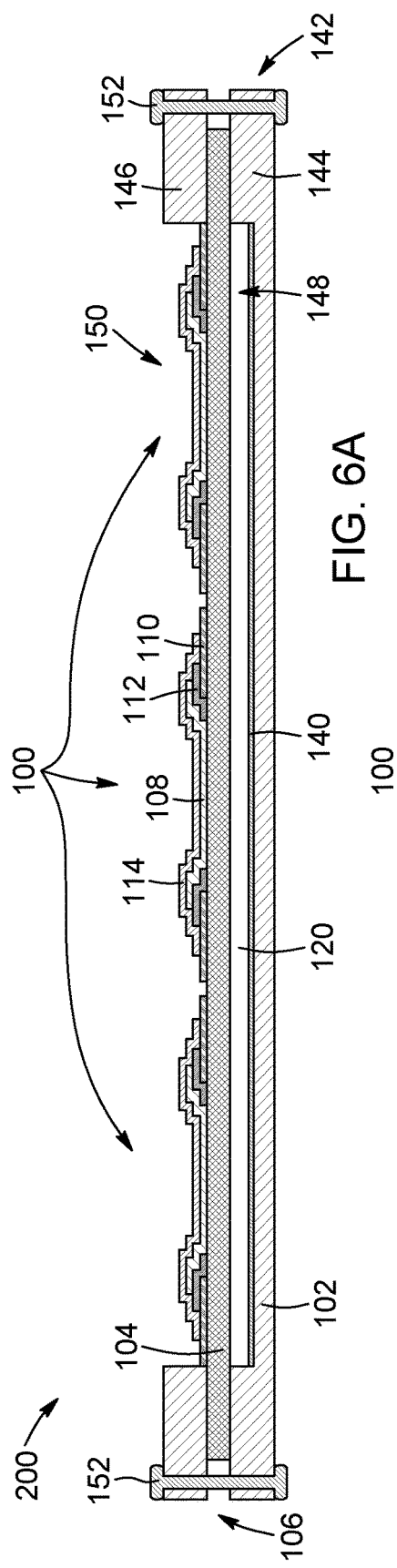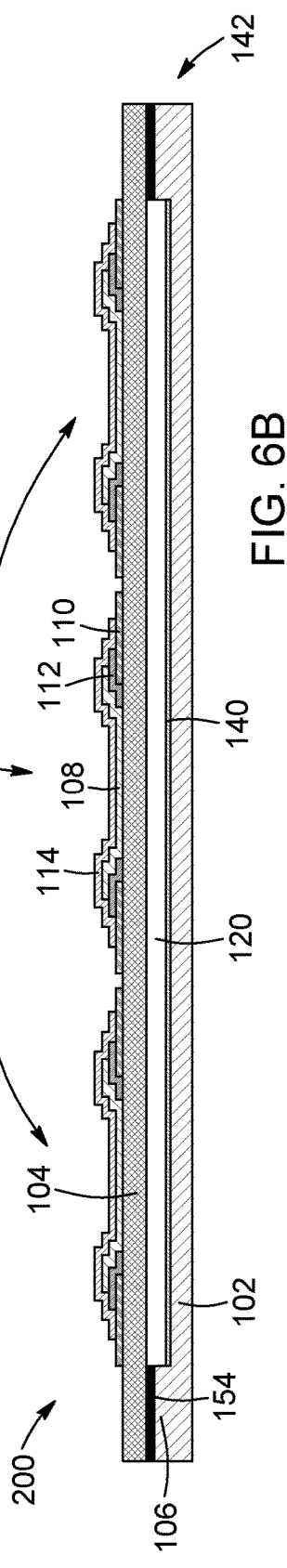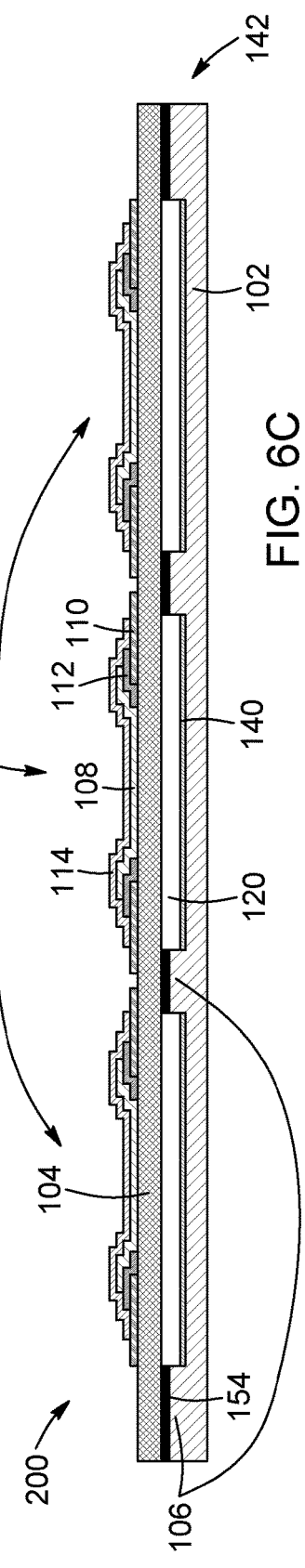

MICROBOLOMETER DETECTORS AND ARRAYS FOR PRINTED PHOTONICS APPLICATIONS

RELATED PATENT APPLICATION

The present application claims priority to U.S. Provisional Patent Application No. 62/760,484 filed on Nov. 13, 2018, the disclosure of which is incorporated herein by reference in its entirety.

TECHNICAL FIELD

The technical field generally relates to microbolometers, and more particularly, to microbolometer detectors and arrays fabricated using printing techniques, particularly ink-based printing techniques.

BACKGROUND

Thermal detectors are devices that absorb energy from incident electromagnetic radiation and convert the absorption-generated heat into an electrical signal indicative of the amount of absorbed radiation. Perhaps the most prominent thermal detectors currently available are uncooled microbolometer detectors or, simply, microbolometers. A microbolometer typically includes a suspended platform or bridge structure having a low thermal mass, which is held above and thermally insulated from a substrate by a support structure. The platform is provided with a thermistor, which is a resistive element whose electrical resistance changes in response to temperature variations caused by the absorbed radiation. The thermistor may, for example, be composed of a material having a high temperature coefficient of resistance (TCR), such as vanadium oxide and amorphous silicon. Because they do not require cryogenic cooling, uncooled microbolometers can operate at room temperature. This makes them well suited for integration within compact and robust devices that are often less expensive and more reliable than those based on cooled detectors. Other advantages of uncooled microbolometers include reduced power consumption, smaller size, and reduced weight. Uncooled microbolometers can be used in various civilian and military applications, in fields such as defense and security, aerospace and astronomy, inspection and maintenance, night vision, transportation, pollution and fire detection, spectroscopy, and remote sensing.

Arrays of uncooled microbolometers can be fabricated on a substrate using common integrated-circuit-based microfabrication techniques, such as photolithography and surface micromachining. In such techniques, microbolometer components are successively deposited and patterned on a substrate using thin-film deposition techniques paired with selective photoresist and sacrificial layer etching processes. In some applications, microbolometer detectors can be fabricated using a monolithic integration approach in which the substrate, typically provided with an underlying readout integrated circuit (ROIC), is pre-manufactured using complementary metal-oxide-semiconductor (CMOS) processes. Uncooled microbolometer arrays are often referred to as "focal plane arrays" (FPAs), while the individual microbolometer detectors forming the arrays can be referred to as "microbolometer pixels" or, simply, "pixels".

In most current applications, uncooled microbolometers are used to sense radiation in the infrared region of the electromagnetic spectrum, usually in the mid-wavelength infrared, encompassing wavelengths ranging from about 3 to about 5 micrometers ($\mu m$), or in the long-wave infrared, encompassing wavelengths ranging from about 8 to about 15 $\mu m$. These arrays are often integrated in uncooled thermal cameras for sensing infrared radiation emanating from an observable scene. Each microbolometer pixel absorbs some infrared radiation resulting in a corresponding change in the pixel temperature, which in turn produces a corresponding change in electrical resistance of the thermistor. A two-dimensional pixelated thermal image representative of the infrared radiation received from the scene can be generated by converting the changes in electrical resistance of each pixel into an electrical signal that can be displayed on a screen or stored for later viewing or processing. More recently, work and research have been carried out to extend the spectral range of operation of uncooled microbolometers beyond the traditional infrared range, notably in the far-infrared and terahertz (or sub-millimeter) spectral regions.

While conventional uncooled microbolometer detectors fabricated using integrated-circuit-based techniques based on photolithography have advantages, they also have certain drawbacks and limitations. Examples of such drawbacks and limitations include small surface area coverage, relatively high cost, high processing temperature, high material consumption, limited fabrication flexibility, complex processing procedures, and limited compatibility with organic materials. Challenges therefore remain in the manufacturing of microbolometer detectors.

SUMMARY

The present description generally relates to microbolometer detectors and arrays fabricated using printed techniques, including ink-based printing technology, such as, for example, inkjet printing, aerosol jet printing, screen printing, and roll-to-roll printing.

In accordance with an aspect, there is provided a microbolometer detector including a substrate, a platform suspended above the substrate, and a thermistor printed on the platform and made of a thermistor material that includes an electrically conducting polymer.

Depending on the application, the substrate and the platform can each be made of a flexible material, for example a polymer-based flexible material, a semi-flexible material, or a rigid material.

In one embodiment, the electrically conducting polymer of the thermistor can include poly(3,4-ethylenedioxythiophene) (PEDOT). In one variant, the thermistor material can include a functionalized PEDOT or a PEDOT-based copolymer. In some embodiments, the functionalized PEDOT can be PEDOT functionalized with substituents to improve the dispersibility of the PEDOT in the solvent that is used to prepare the ink formulation applied for the fabrication of the thermistor. For example, the PEDOT can be functionalized with substituents such as alkyl, alkoxy, alkyl sulfonate groups, and combinations thereof.

In one embodiment, the thermistor material can be a PEDOT-based copolymer, such as poly(3,4-ethylenedioxythiophene) polystyrene sulfonate (PEDOT:PSS). In other embodiments, the PEDOT-based copolymer can include PEDOT or PEDOT:PSS, which can be further modified with tetramethacrylate (TMA) or polyethylene glycol (PEG) groups. In one embodiment, the PEDOT can be dispersed in various solvents, such as, for example, toluene, dimethyl sulfoxide (DMSO), and water, with various concentrations and solids contents. The PSS concentration can be adjusted to provide the PEDOT:PSS copolymer with certain characteristics, for example to optimize or improve the TCR of the thermistor.

In one embodiment, the microbolometer detector includes an electrode structure printed on the platform and electrically connected to the thermistor. The electrode structure can be made of an electrode material that includes silver, copper, gold, aluminum, carbon, a metal composite, an electrically conducting metal oxide, or any combination thereof, which can be printed using an ink formulation based on nanoparticles, nanorods, nanowires, nanotubes, and/or micro-pellets of these metals, metal composites or metal oxides.

In one embodiment, the microbolometer detector includes an ohmic contact layer interposed and forming an ohmic contact between the thermistor and the electrode structure. The ohmic contact layer can be made of an ohmic contact material including an electrically conducting polymeric composition selected to ensure or promote structural and electrochemical compatibility between the thermistor material and the electrode material. In one variant, the ohmic contact layer can be made of an ohmic contact material that includes a PEDOT-based polymeric composition, for example PEDOT and a carbon-based nanomaterial, such as carbon nanotubes (CNTs). For example, in one embodiment, the thermistor material can include PEDOT:PSS, the electrode material can include silver, and the ohmic contact material can include a composition of PEDOT and CNTs.

In one embodiment, the microbolometer detector includes a passivation layer disposed over the thermistor.

In one embodiment, the microbolometer detector includes an optical absorber disposed over and in thermal contact with the thermistor. The optical absorber is configured to absorb electromagnetic radiation incident thereonto and convert the absorbed radiation into heat. The heat thus generated is transmitted to the thermistor, increases its temperature, and produces a corresponding change in its electrical resistance which can be measured to convey information about the amount of absorbed radiation energy.

In one embodiment, the microbolometer detector includes an encapsulating structure formed on the platform and defining a cavity encapsulating the thermistor. The encapsulating structure can include a cap supported above the platform in a spaced relationship therewith, and a spacer supporting the cap. In one variant, the encapsulating structure can further include an optical lens, for example mounted to the cap, and configured to focus electromagnetic radiation incident thereon onto the platform.

In accordance with another aspect, there is provided a microbolometer detector including a flexible substrate; a platform suspended above the flexible substrate; a thermistor printed on the platform and made of a thermistor material including a poly(3,4-ethylenedioxythiophene) polystyrene sulfonate (PEDOT:PSS) polymeric composition; an electrode structure printed on the platform, the electrode structure being electrically connected to the thermistor and made of an electrode material including silver; and an ohmic contact layer interposed between the thermistor and the electrode structure and made of an ohmic contact material including a PEDOT-carbon nanotube polymeric composition.

In accordance with another aspect, there is provided a microbolometer array including a plurality of arrayed microbolometer detectors, such as described above. Depending on the application, the microbolometer detectors can be arranged to form a linear or a two-dimensional matrix.

In accordance with another aspect, there is provided a printing method for fabricating a microbolometer detector or an array of such detectors, such as disclosed herein, the detectors including a suspended platform having an electrically-conducting-polymer-based thermistor printed thereon.

In some implementations, the present techniques relate to the design and fabrication of uncooled infrared microbolometer detectors and detector arrays using printing techniques on flexible substrates, such as inkjet printing or aerosol jet printing. For example, the present techniques can relate to the pixel array structure design and related fabrication materials and processes of the printed microbolometers, including their encapsulation, passivation, and thermal isolation. The present techniques are not limited to mid-wavelength infrared detection but can also be used in applications in other infrared spectral regions or in the terahertz region. The present techniques can also be applied to the design of printed microbolometer detectors for detection at specific frequencies or in specific frequency bands using frequency-selective absorbers. In some implementations, the manufacturing method can also be adapted for printing on rigid or semi-rigid substrates, such as glass, silicon wafers, or printed circuit board substrates.

It is to be noted that other method and process steps may be performed prior to, during or after the method and process steps described herein. The order of one or more of the steps may also differ, and some of the steps may be omitted, repeated, and/or combined, depending on the application.

Other features and advantages of the present description will become more apparent upon reading of the following non-restrictive description of specific embodiments thereof, given by way of example only with reference to the appended drawings. Although specific features described in the above summary and the foregoing detailed description may be described with respect to specific embodiments or aspects, it should be noted that these specific features can be combined with one another unless stated otherwise.

BRIEF DESCRIPTION OF THE DRAWINGS

FIGS. 2A to 2H illustrate steps of a printing process to fabricate the microbolometer detector of FIGS. 1A and 1B.

In FIG. 5B, the optical absorber layer and the passivation layer of each microbolometer detector have been removed to better illustrate the configuration of the underlying components.

FIGS. 6A to 6C are schematic cross-sectional elevation views of microbolometer arrays, in accordance with three other possible embodiments.

DETAILED DESCRIPTION

Figure 1A:
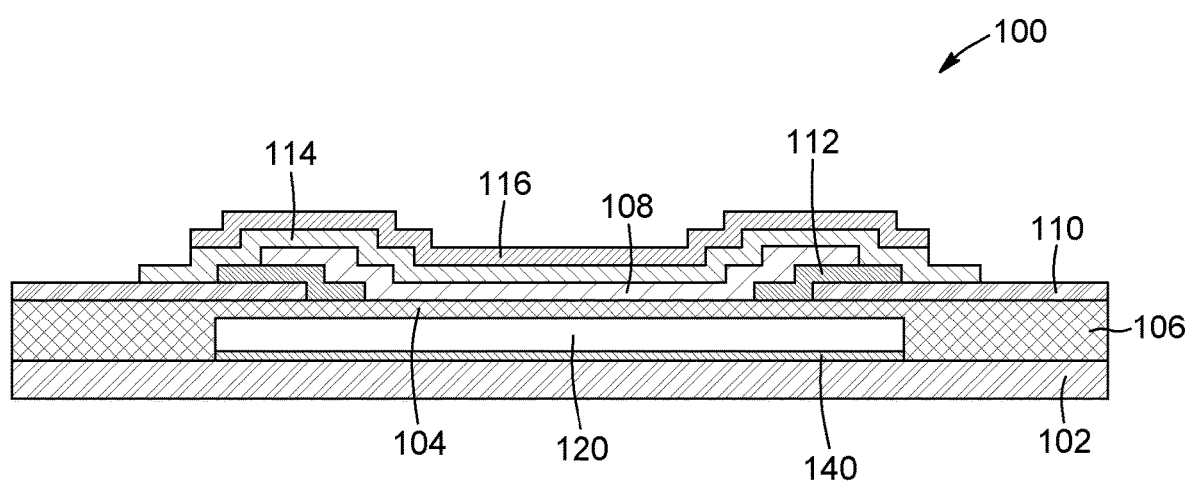
FIG. 1A is a schematic cross-sectional elevation view of a microbolometer detector, in accordance with a possible embodiment.

In the present description, similar features in the drawings have been given similar reference numerals. To avoid cluttering certain figures, some elements may not be indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. As can be appreciated, such spatially relative terms are intended to encompass different orientations in the use or operation of the present embodiments, in addition to the orientations exemplified in the figures.

In the present description, when a first element is referred to as being "on", "above", "below", "over", or "under" a second element, the first element can be either directly or indirectly on, above, below, over, or under the second element, respectively, such that one or multiple intervening elements may be disposed between the first element and the second element.

Unless stated otherwise, the terms "connected" and "coupled", and derivatives and variants thereof, are intended to refer to any connection or coupling, either direct or indirect, between two or more elements. For example, the connection or coupling between the elements may be mechanical, optical, electrical, thermal, chemical, logical, operational, or any combination thereof.

In the present description, the terms "a", "an", and "one" are defined to mean "at least one", that is, these terms do not exclude a plural number of elements, unless stated otherwise.

Terms such as "substantially", "generally", and "about", that modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or equivalent function or result). In some instances, the term "about" means a variation of ±10 percent of the stated value. It is noted that all numeric values used herein are assumed to be modified by the term "about", unless stated otherwise.

The present description generally relates to microbolometer detectors, and more particularly to microbolometer detectors and detector arrays fabricated using printed electronics techniques, and to related print-based fabrication methods.

In the present description, the term "microbolometer" is intended to refer to a thermal detector that operates by absorbing incident electromagnetic radiation, converting the absorbed radiation into heat, and sensing the resulting temperature increase of the detector through a change of the electrical resistance of a thermistor made of a thermistor material having a suitable TCR. The thermistor is generally thermally insulated, such that its temperature changes in response to the absorbed incident radiation but remains mostly unaffected by the temperature of its surroundings. Microbolometers can be classified as either cooled or uncooled, depending on whether their operation involves cryogenic cooling or not. It is also appreciated that, in the present description, the terms "microbolometer" and "bolometer" can generally be used interchangeably.

In the present description, the terms "light" and "optical", and variants and derivatives thereof, are intended to refer to radiation in any appropriate region of the electromagnetic spectrum. These terms are therefore not limited to visible light, but can also include, without being limited to, the infrared, terahertz and millimeter wave regions. For example, in some implementations, the present techniques can be used with electromagnetic signals having wavelengths ranging from about 0.2 µm to about 3000 µm. However, this range is provided for illustrative purposes only and some of the present techniques may operate outside this range. Infrared radiation is commonly divided into various spectral regions, which include the near-infrared (NIR) region for wavelengths ranging from 0.7 to 1.4 µm; the short-wavelength infrared (SWIR) region for wavelengths ranging from 1.4 to 3 µm; the mid-wavelength infrared (MWIR) region for wavelengths ranging from 3 to 8 µm; the long-wavelength infrared (LWIR) region for wavelengths ranging from 8 to 15 µm; and the far-infrared (FIR) region for wavelengths ranging from 15 to 1000 µm. It is appreciated that the definitions of different infrared regions in terms of spectral ranges, as well as their limits, can vary depending on the technical field under consideration, and are not meant to limit the scope of application of the present techniques.

The microbolometer detectors and arrays disclosed herein can be fabricated by means of printed electronics and photonics techniques, particularly ink-based printing techniques.

In the present description, the terms "printed electronics" and "printed photonics" refer to a set of printing technologies used to create electronic and photonic structures on various substrates. The term "printed" refers in this context to various additive, non-contact, and/or maskless patterning and manufacturing techniques capable of producing electronic and photonic devices and systems from the printed matter. Examples of printing techniques include, but are not limited to, inkjet printing, aerosol jet printing, screen printing, roll-to-roll printing, intaglio printing, flexographic printing, offset printing, stamp printing, and gravure printing. Compared to conventional integrated-circuit-based techniques involving subtractive processes, such as photolithography and etching, additive printing processes offer a number of advantages for developing alternative bolometer devices. Such advantages include simplicity, lower cost, lower processing temperatures, reduced material waste, scalability to large coverage areas, and compatibility with flexible plastic and other organic substrates.

Inkjet printing is a promising additive manufacturing technique used for fabricating flexible electronic devices in various fields and applications, including the semiconductor, chemical, biological, biomedical, and pharmaceutical industries. Inkjet printing is usually classified as either continuous inkjet printing or drop-on-demand (DOD) printing. Inkjet printing is capable of printing features with linewidth as small as 1 µm to allow production miniaturization. Inkjet printing can offer low-cost and low-temperature selective printing on large-area flexible substrates, which may not be easily achievable with standard photolithography. Inkjet printing processes can be digitally controlled by a computer, thus avoiding the use of masks or screens, while enabling simpler and faster device manufacturing and customization. With a typical distance between the substrate and the inkjet printer head of just one millimeter (mm), inkjet printing is a non-contact deposition and patterning technique. The non-contact nature of inkjet printing reduces the risk of causing damage to fragile substrates and makes it possible to use inkjet printing for material deposition on top of existing three-dimensional (3D) topologies and inside trenches and cavities, which can be a challenge for traditional contact printing techniques, such as screen printing and roll-to-roll printing. Industrial inkjet printers have a large number of parallel nozzles, and several print heads can be stacked into an array to improve throughput. By printing multiple layers of material one on top of the other, inkjet printing can also be used as a 3D printing method. Because inkjet printing can, in principle, be used with any digital layout, which can contain either fine patterns or homogeneous layers, it has the potential to be used to print a wide range of functional materials.

The present techniques have potential use in various consumer, industrial and military applications that may benefit from or require printed microbolometer detectors produced at low cost on large-area flexible substrates. Non-limiting examples of possible fields of use include defense and security, medicine, industrial control, robotics, sports and entertainment, food supply chain management, and the Internet of Things. In some implementations, the present techniques can be used for detection of infrared radiation and contact and non-contact temperature sensing.

Various implementations of the present techniques are described below with reference to the figures.

Figure 1B:
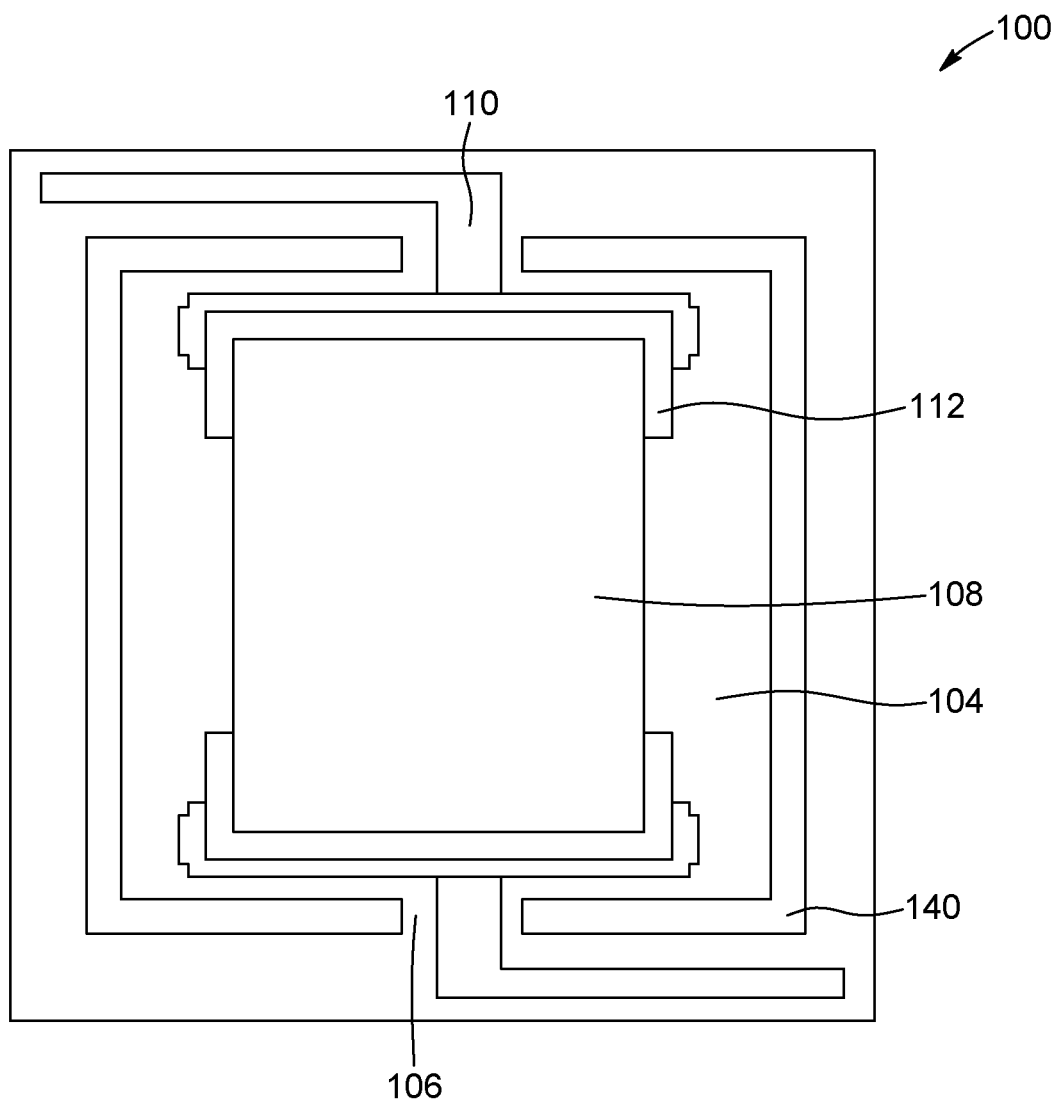
FIG. 1B is a schematic top plan view of the microbolometer detector of FIG. 1A, in which the optical absorber layer and the passivation layer have been removed to better illustrate the configuration of the underlying components.

Referring to FIGS. 1A and 1B, there are illustrated a schematic cross-sectional elevation view and a schematic top plan view, respectively, of a possible embodiment of an uncooled microbolometer detector 100. For example, the microbolometer detector 100 of FIG. 1 can be used as one pixel of a microbolometer array of a thermal camera or imaging device. As such, the term "microbolometer detector" may, in some instances, be used interchangeably with the term "microbolometer pixel". The microbolometer detector 100 is formed as a stack of layers printed on a substrate 102 and includes a suspended platform 104, a support structure 106, a thermistor 108, an electrode structure 110, an ohmic contact layer 112, a passivation layer 114, and an optical absorber 116. The structure, composition, and operation of these and other possible components of the microbolometer detector 100 will be described in greater detail below. It is noted that in FIG. 1B, the passivation layer and the optical absorber have been omitted to better illustrate the configuration of the underlying components, namely the thermistor 108, the electrode structure 110, and the ohmic contact layer 112.

Depending on the application, the microbolometer detector 100 can be fabricated either entirely or partially by printing technology. Non-limiting examples of printing techniques that may be used include inkjet printing, aerosol jet printing, screen printing, and roll-to-roll printing. FIGS. 2A to 2H illustrate possible steps of a printing process used to fabricate a microbolometer detector 100, such as the one of FIGS. 1A and 1B.

Returning to FIGS. 1A and 1B, the substrate 102 provides a structure that physically holds and supports the other components of the microbolometer detector 100. In some implementations, the substrate 102 can be made of a flexible material. The flexible material can be a polymer material, such as, for example, polyethylene terephthalate (PET), polyethylene naphthalate (PEN), polypropylene (PP), polyimide (PI), or polycarbonate (PC). Non-limiting examples of advantages of providing a microbolometer detector or array on a flexible substrate include a compatibility with uneven surfaces or structures, a compatibility with large area coverage, and the possibility of forming microbolometer arrays that can be folded, rolled, and/or stretched. In other implementations, however, the substrate 102 can be a semi-flexible or a rigid substrate, which can be made, for example, from fused silica, quartz, silicon, or fiberglass.

Depending on the application, the substrate 102 can be a single (FIG. 2A) or a multilayered structure. In some implementations, the thickness of the substrate can range from about 5 µm to about 2000 µm, although other thickness values are possible in other implementations. In some embodiments, the printing process used can be optimized in accordance with the surface tension and/or morphology of the substrate 102. The printing of subsequent layers on the substrate 102 can involve various surface treatments to improve film adhesion and surface tension between the substrate 102 and the subsequently printed layers. Depending on the application, such surface treatments can involve wet and/or dry chemical processes.

The microbolometer detector 100 also includes a platform 104 suspended above the substrate 102 by the support structure 106. In the present description, the term "platform" generally refers to a substantially planar suspended bridge or membrane structure, typically having greater horizontal dimensions than vertical thickness. In the present description, the term "horizontal" refers to directions lying in a plane parallel to the substrate 102, while the term "vertical" refers to a direction perpendicular to the plane of the substrate 102.

The suspension of the platform 104 above the substrate 102 can provide thermal isolation to the thermistor 108. By thermally insulating the thermistor 108, the detection sensitivity of the microbolometer detector 100 can be enhanced. The platform 104 may be shaped as a substantially rectangular, single or multilayer structure, and be made of an electrically insulating, mechanically self-supportive, and low-stress material. As for the substrate 102, the platform 104 can be made of a flexible material, for example with a polymeric composition, a semi-flexible material, or a rigid material. Non-limiting examples of suitable materials that can be used to form the platform 104 include: SU-8 photoresist; InkOrmo, a UV-curable hybrid polymer manufactured by micro resist technology GmbH (Berlin, Germany); polyvinylphenol (PVP); polydimethylsiloxane (PDMS); polyimide (PI); polyethylene terephthalate (PET); polycarbonate (PC); and various other organic and inorganic dielectric materials.

Depending on the type and thickness of the substrate 102, the platform 104 may have lateral dimensions ranging between about 50 µm and about 10 mm and a thickness ranging between about 10 µm and 2 mm, although other dimensions can be used on other implementations. Depending on the application, the platform 104 can be formed in a variety of shapes, dimensions, and configurations, without departing from the scope of the present techniques. Furthermore, in some implementations, for example those that do not include an optical absorber layer, the platform 104 may be made of a material that absorbs and is heated by electromagnetic radiation in the operation spectral range of the microbolometer detector 100.

In the illustrated embodiment, the platform 104 is printed on top of a sacrificial layer 118 (see FIG. 2C). The sacrificial layer 118 can be formed on the substrate 102 during the fabrication process of the microbolometer detector 100 (FIG. 2B) and be subsequently dissolved or otherwise removed to define a gap 120 between the substrate 102 and the platform 104 (see FIG. 2G). In some implementations, the sacrificial layer 118 can be dissolved using a variety of solvents either in liquid or vapor phase. Depending on the device architecture and materials chemistry, plasma release of the sacrificial layer 118 may also be possible. Water-soluble polymers, such as poly(vinyl alcohol) (PVA), poly (acrylic acid) (PAA), polyethylene glycol (PEG), polyvinyl pyrrolidone, and the like, can be used as the sacrificial layer 118 material. It is noted that when the platform 104 is made of a polymeric material, common removers in standard microfabrication processes generally cannot be used to dissolve the sacrificial layer 118.

In other implementations, such as in the case of thin substrates, for example made of PI, PET, or PC, laser trimming or other similar techniques that do not involve the use of a sacrificial layer may be used to form the platform 104 and achieve thermal isolation of the thermistor 108. Such a laser trimming process can be performed by using a high-repetition-rate ultrashort-pulse laser. The isolation of the detector can be achieved by directly trimming the edges of the detector. The cavity and detector suspension can be obtained by stacking multiple substrates using thermocompression bonding or a lamination process. Thermocompression bonding or a lamination process can also be used for hermetic sealing of the pixel array, as described below.

In some implementations, a reflector 140 can be deposited on the substrate 102 under the platform 104 (see also FIG. 2A). The reflector 140 may include a thin metal film, for example a thin aluminum, gold, or silver film. The reflector 140 may be a continuous or discontinuous film. The reflector 140 can form an optical resonant cavity with the platform 104 separated therefrom by the gap 120, which can enhance the optical absorption properties of the microbolometer detector 100. Depending on the application, the reflector 140 can be formed by printing techniques or other deposition techniques, for example vacuum evaporation.

Referring still to FIGS. 1A and 1B, the platform 104 is held above the substrate 102 by the support structure 106. In the present description, the term "support structure" is used to refer broadly to a structure configured to hold the platform 104 in a spaced-apart relationship above the substrate 102. In some implementations, the support structure 106 can provide enough mechanical rigidity and strength to maintain the platform 104 at a height ranging from about a few microns to a few hundreds of microns above the substrate 102, although other height values are possible in other implementations. The support structure 106 can also provide a path for the electrode structure 110 that connects the thermistor 108 to an ROIC (not shown). The ROIC, which can be an electrical multiplexing circuit, can be provided in the substrate 102 and include thin-film transistor (TFT)-based integrated circuits and other passive and/or active components. In some embodiments, the ROIC can be fabricated using a hybrid approach including both printed electronic devices and surface-mounted CMOS devices on a flexible substrate.

The support structure 106 may be provided as one or more printed thin-film layers and may be made of a low-stress and self-supporting material, such as those listed above for the substrate 102 and the platform 104. Depending on the application, the support structure 106 may or may not have the same composition as the platform 104. The support structure 106 is generally fabricated (e.g., printed) concurrently with the platform 104.

The support structure 106 can extend along or close to the outer periphery of the platform 104. In the embodiment of FIGS. 1A and 1B, the support structure 106 includes two support beams located on two opposite sides of the platform 104, but other configurations could be used in other embodiments, for example with four support beams provided on the four corners of the platform 104. In particular, the support structure 106 can have a variety of configurations to meet the requirements or preferences (e.g., structural, electrical, and/ or thermal) of a given application. For example, in some implementations, the support structure 106 may extend closer to the center of the platform 104 rather than near its outer periphery.

In the embodiment of FIGS. 1A and 1B, the microbolometer detector 100 includes a thermistor 108 printed on the platform 104 (see also FIG. 2F). In the present description, the term "thermistor" generally refers to a thermally sensitive resistor made of any suitable material, structure or device having an electrical resistance that changes as a function of its temperature, generally in a predictable and controllable manner. The thermistor 108 can be made of a material having a high TCR at room temperature, for example at least 0.5% per kelvin. In the illustrated embodiment, the microbolometer detector 100 includes a single thermistor 108 printed on the platform 104 as a rectangular thin film whose width, length, and thickness may be selected in order to control its electrical resistance. As can be appreciated, the size, shape, and arrangement of the thermistor 108 may be varied depending on the application. In some embodiments, the microbolometer detector 100 can include two or more thermistors 108 printed on the platform 104.

The thermistor 108 can be made of a thermistor material composed of an electrically conducting polymer, for example a semiconducting polymer, compatible with print-based deposition and patterning technologies.

In some embodiments, the electrically conducting polymer can include poly(3,4-ethylenedioxythiophene) (PEDOT). PEDOT is a flexible, electrically conducting conjugated polymer that is optically transparent in the visible region. PEDOT is generally a low molecular weight polymer that can present low solubility in some solvents. Therefore, in some embodiments, PEDOT can be modified and/or functionalized to increase its dispersibility or solubility. Thus, in some embodiments, the conducting polymer can include PEDOT functionalized with substituents to improve dispersibility of PEDOT in the solvent that is used to prepare the ink composition applied for the fabrication of the thermistor. For example, PEDOT can be functionalized with substituents including alkyl, alkoxy, and/or alkyl sulfonate groups, to name a few.

In other embodiments, the conducting polymer can include a PEDOT-based copolymer, such as poly(3,4-ethylenedioxythiophene) polystyrene sulfonate (PEDOT:PSS). PSS is an electrically insulating polymer, generally of a high molecular weight, which can provide flexibility and increased solubility in water and/or other solvents, resulting in improved processability. In a PEDOT:PSS copolymeric structure, the PEDOT segments are electrostatically attached to the PSS polymer chains. The PEDOT to PSS molar and weight ratios can be varied depending on the application. The balancing between the optoelectronic properties of PEDOT:PSS co-polymers, with their structure and the ratio between their electrically conducting part (PEDOT) and their electrically insulating part (PSS), can make them good transparent printable thermistor materials. In some variants, PSS can be replaced or combined with other oligomeric or polymeric segments including, for example, tetramethacrylate (TMA) or polyethylene glycol (PEG). The use of PEDOT:PSS formulations as thermistor material can be advantageous since PEDOT:PSS is available at low cost, optically transparent to visible light, mechanically flexible, thermally stable, and easily processable.

Thermistor films of PEDOT:PSS can be deposited by inkjet printing or other ink-based printing techniques by using suitable PEDOT:PSS-based ink formulations. Various types of PEDOT:PSS-based ink formulations can be used including, but not limited to, solutions, emulsions, and dispersions. The ink formulations can be chemically optimized or adjusted by changing the PSS concentration and/or the pH of the dispersion to improve the TCR and/or the sheet resistance of the PEDOT:PSS thermistor to be printed. In some implementations, a PEDOT:PSS thermistor having a TCR ranging from about 0.5%/K to about 10%/K can be obtained.

In some implementations, the PEDOT:PSS copolymer can be dispersed/dissolved in a mixture of one or more solvents, such as water and/or organic solvents, to obtain PEDOT:PSS-based ink formulations. Non-limiting examples of organic solvents that can be used to disperse/dissolve PEDOT:PSS include toluene, DMSO, ethylene glycol, and the like. In some implementations, the PEDOT:PSS-based ink formulations can include some additives, if required or desired, to further improve their processability and/or enhance the thermistor material properties. Non-limiting examples of possible additives include surfactants, electrical conductivity enhancers, dopants, stabilizers, and the like.

Referring still to FIGS. 1A and 1B, the microbolometer detector 100 includes an electrode structure or layer 110 configured to provide an electrical connection between the thermistor 108 and the ROIC (e.g., an electrical multiplexing circuit) and other electronics (not shown). The ROIC can be active or passive and be configured to measure changes in the electrical resistance of the thermistor 108 caused by heating resulting from the absorption of electromagnetic radiation.

The electrode structure 110 may be deposited and patterned on the platform 104 using various printing techniques, such as those mentioned above (see also FIG. 2D). The electrode structure 110 may be made of any printable material having a suitable electrical conductivity. Depending on the application, the shape, size, and configuration of the electrode structure 110 may be adjusted to control its electrical and/or thermal properties and, in turn, enhance the performance of the microbolometer detector 100. For example, in the embodiment of FIGS. 1A and 1B, the electrode structure 110 is connected to the thermistor 108 at two opposite ends thereof.

In some implementations, the electrode structure 110 can be printed by inkjet or aerosol jet printing using ink formulations based on metallic or other electrically conducting microstructures and nanostructures (e.g., nanoparticles, nanorods, nanowires, nanotubes, and micro pellets) or other electrically conducting organic and inorganic polymers dispersed in a solvent. For example, the microstructures and nanostructures can be made of silver, copper, gold, aluminum, carbon, a metal composite (e.g. polymer-metal composite), and/or an electrically conducting metal oxide.

In some implementations, a thermal treatment and sintering process of the printed electrode structure 110 can be performed. The sintering temperature can be selected based on the nature of the substrate and the temperatures that can be withstood by the other printed materials forming the microbolometer detector 100. In some applications, such temperature constraints can put some limitations on the achievable sheet resistance of the electrode structure 110. In such a case, localized surface heating, for example using a pulsed laser source or another high-intensity pulsed light source can be used to achieve a required or desired sheet resistance, while avoiding or at least mitigating thermal diffusion and degradation of the substrate and other printed materials.

Referring still to FIGS. 1A and 1B, the microbolometer detector 100 includes an ohmic contact layer 112 printed and forming an ohmic contact between the thermistor 108 and the electrode structure 110 (see also FIG. 2E). The ohmic contact layer 112 provides a low-resistance electrical path between the thermistor 108 and the electrode structure 110, for example less than one percent of the resistance of the thermistor 108. In addition to providing a low-resistance path for electrical current to flow in and out of the thermistor 108, the ohmic contact layer 112 can ensure or promote structural and/or chemical compatibility between the thermistor 108 and the electrode structure 110. The composition of the ohmic contact layer 112 can be selected by considering the compositions of both the thermistor material and the electrode material.

In some implementations, the ohmic contact layer 112 can be made of an ohmic contact material based on PEDOT, such as an ohmic contact material that includes PEDOT and a carbon-based nanomaterial. For example, the carbon-based nanomaterial can include carbon nanowires, graphene, carbon nanotubes (CNTs), fullerenes, and a combination thereof. The CNTs can be single-walled nanotubes (SWNTs) and/or multi-walled nanotubes (MWNTs). In some implementations, the ohmic contact material can include PEDOT and CNTs, wherein the ratios of PEDOT and CNTs can vary to achieve a required or desired dispersion of CNTs having a sufficiently high electrical conductance, while avoiding agglomeration in the dispersion. In some implementations, the CNTs can have a length ranging from about 50 nanometers (nm) to about 2 µm, and a diameter of a few nanometers. In some implementations, the PEDOT-CNT compound can be dispersed/dissolved in a mixture of one or more solvents, such as water and/or organic solvents, to obtain PEDOT-CNT-based ink formulations. Non-limiting examples of organic solvents that can be used to disperse/dissolve PEDOT-CNT compounds include toluene, DMSO, ethylene glycol, and the like.

In some implementations, the thermistor material can include a printable PEDOT-based polymer and the ohmic contact layer can be made of an ohmic contact material that includes a printable PEDOT-based polymeric composition that is different from the PEDOT-based polymer used for the thermistor. The printable PEDOT-based polymeric composition used for the ohmic contact layer 112 can be selected in view of its structural and electrochemical compatibility with both the thermistor material and the electrode material. In one embodiment, the thermistor material can include PEDOT:PSS, the electrode material can include silver, and the ohmic contact material can include a printable composition of PEDOT-carbon nanotubes (PEDOT-CNT). In particular, it has been found that PEDOT-CNT can exhibit a good chemical compatibility with PEDOT:PSS and provide a low-resistance contact between PEDOT:PSS and a silver-based electrode structure.

Referring still to FIGS. 1A and 1B, the microbolometer detector 100 can further include a passivation layer 114 printed on the thermistor 108. The passivation layer 114 is configured to seal or cover the thermistor 108 and the ohmic contact layer 112 by providing a barrier to the diffusion of water, oxygen and other impurities that could otherwise degrade or affect the performance of the microbolometer detector 100. Depending on criteria such as the performance, reliability, and life expectancy of the microbolometer detector 100, the passivation layer 14 can be prepared by various techniques including, but not limited to, deep coating, inkjet printing, aerosol jet printing, spray coating, sputtering, and low temperature plasma chemical vapor deposition. Non-limiting examples of materials that can be used for passivation of printed devices include liquid glasses, metal oxides, silicon oxides, and silicon nitrides.

The microbolometer detector 100 can further include an optical absorber 116 printed or otherwise formed over and in thermal contact with the thermistor 108 (see also FIG. 2H). The optical absorber 116 is configured to absorb electromagnetic radiation incident thereon and to convert the absorbed radiation into heat. The heat thus generated is transmitted to the thermistor 108, increases its temperature, and produces a corresponding change in its electrical resistance that can be measured to convey information about the intensity of the incident radiation. The provision of the optical absorber 116 can enhance the sensitivity and overall performance of the microbolometer detector 100, for example in near-infrared and far-infrared applications. As noted above, the term "optical" refers to electromagnetic radiation in general and is not limited to the visible or another portion of the electromagnetic spectrum. It is noted that some embodiments may not include a dedicated optical absorber layer, such as those illustrated in FIGS. 3 and 4.

In the present description, the term "thermal contact" generally means that heat conduction occurs directly or indirectly between two elements, that is, the two elements may be in direct contact with each other or may have a sufficiently thermally conducting material present between them. Specifically, the term "thermal contact" is intended to refer to the fact that when the optical absorber 116 is heated upon absorption of electromagnetic radiation, the heat thus generated is conducted, radiated or otherwise transmitted to the thermistor 108, for example through the passivation layer 114.

The optical absorber 116 can be formed by printing ink formulations containing carbon-based materials, such as carbon nanowires, graphene, CNTs, fullerenes, and the like. The thickness of the optical absorber 116 can be selected to tailor its absorption spectrum. It is appreciated, however, that other deposition techniques, for example spray coating and vacuum evaporation, may be considered to deposit a carbon-based optical absorber layer. The choice of a particular deposition technique can be dictated by the thickness of the film to be formed, its uniformity, and the processing temperature. Another approach to enhance the sensitivity of the microbolometer detector 100 and tailor its absorption spectrum is to provide the optical absorber 116 as a frequency selective structure obtained by inkjet printing using different high-electrical-conductivity metallic nanoparticle formulations, such as silver, gold, aluminum, and copper. In other implementations, other suitable materials for the optical absorber 116 can include, without being limited to, metal black, such as gold black, organic black, graphene, carbon nanotubes, chromium, nickel-chromium, vanadium, titanium, and titanium-nitride.

Figure 3:
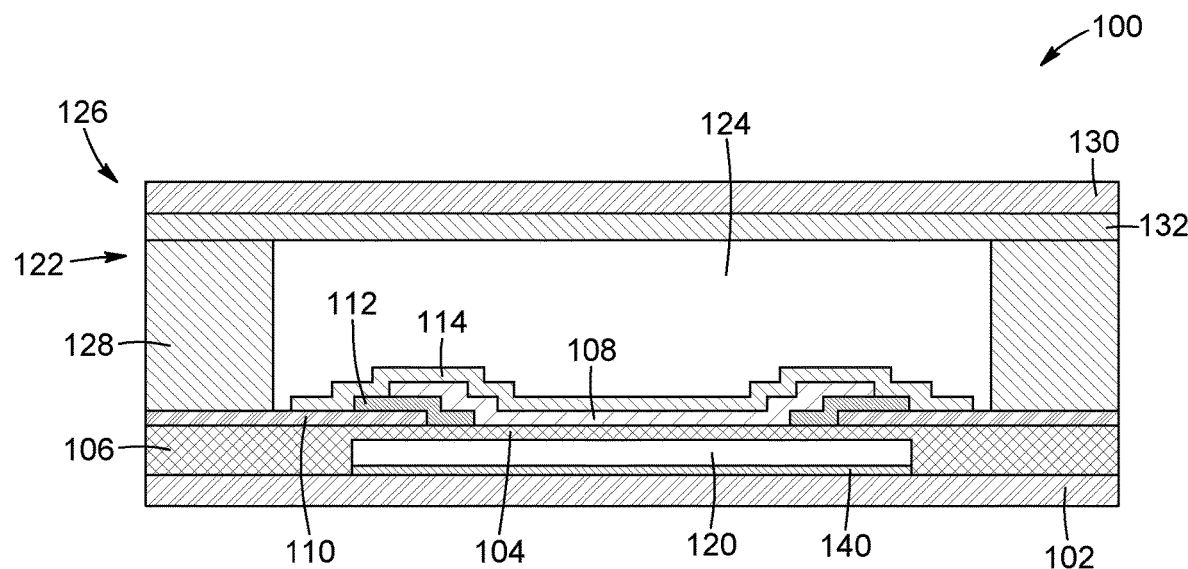
FIG. 3 is a schematic cross-sectional elevation view of a microbolometer detector, in accordance with another possible embodiment.

Referring to FIG. 3, there is illustrated another embodiment of a microbolometer detector 100. The microbolometer detector 100 generally includes a substrate 102, a suspended platform 104, a support structure 106, a thermistor 108, an electrode structure 110, an ohmic contact layer 112, a passivation layer 114, and a reflector 140. An optical absorber such as shown in FIG. 1A could optionally be provided, depending on the application. These features can be generally similar to like features described above with respect to the embodiment of FIGS. 1A and 1B, and they will not be described again in detail.

The microbolometer detector 100 of FIG. 3 further includes an encapsulating structure 122 formed on top of the platform 104 and defining a sealed cavity 124 encapsulating the thermistor 108 and preventing performance degradation caused by diffusion of water, oxygen, and other foreign matter. Depending on the application, the cavity 124 may be under vacuum or filled with a gas having a low thermal conductivity, such as krypton, xenon, and argon. Encapsulation of the microbolometer detector 100 in a hermetic package architecture can be provided to achieve high sensitivity to electromagnetic radiation, stable performance, and long-term reliability. In FIG. 3, the encapsulating structure 122 can include a cap 126 supported above the platform 104 in a spaced relationship therewith and a spacer 128 supporting the cap 126 and defining the depth of the hermetically sealed cavity 124. The cap 126 and the spacer 128 can be formed using various approaches. In one embodiment, the spacer 128 may be fabricated by jet printing or laser trimming, depending on the height of the cavity 124. The spacer 128 may be made of the same type of material as the passivation layer 114 to improve the sealing of the cavity 124. The cap 126 can be configured to provide a required or desired optical transmittance in the spectral band of interest. In the illustrated embodiment, the cap 126 includes a cap substrate 130 and a cap passivation layer 132 formed on the cap substrate 130. For example, the cap substrate 130 can be made of a thin film of polyimide or polyethylene, and the cap passivation layer 132 can be made of the same material as the spacer 128. The encapsulating structure 122 can be formed by turning the cap 126 upside down and placing it on top of the spacer 128, such that the cap passivation layer 132 is brought in contact with and adhered to the spacer 128. Non-limiting examples of the processes which can be used to encapsulate the microbolometer detector 100 include multilayer film lamination, adhesive bonding, metal to metal thermocompression bonding, and laser sealing. The choice of a particular process can be dictated by the processing temperature and the properties of the materials forming the encapsulating structure 122.

Figure 4:
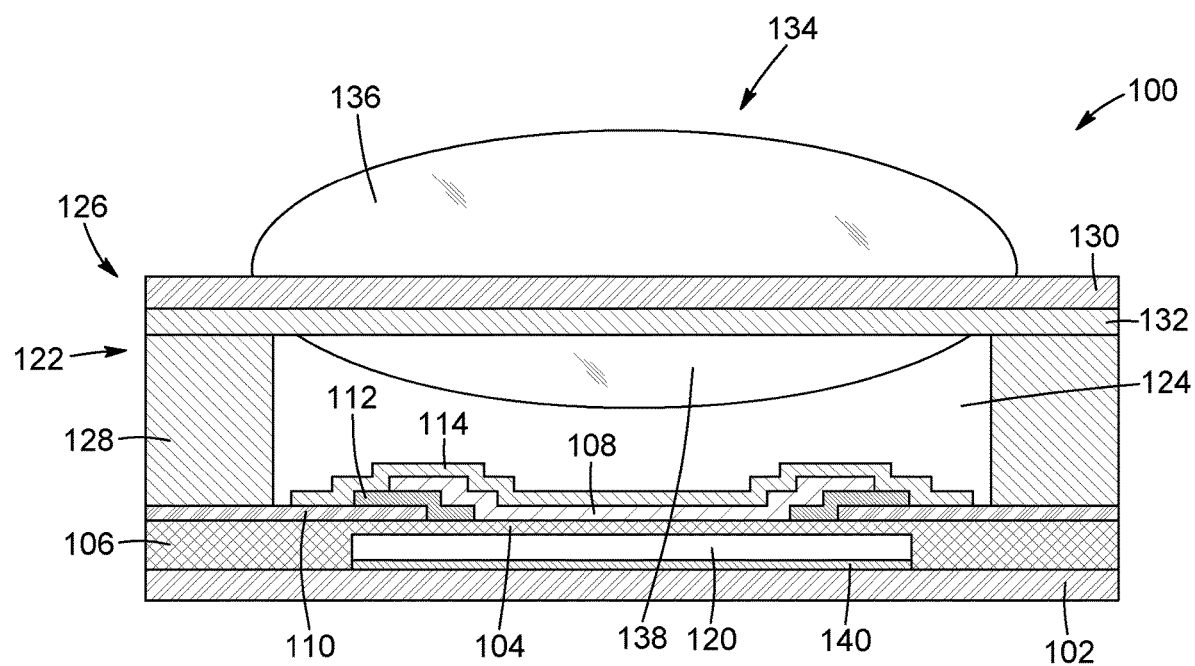
FIG. 4 is a schematic cross-sectional elevation view of a microbolometer detector, in accordance with another possible embodiment.

Referring to FIG. 4, there is illustrated another possible embodiment of a microbolometer detector 100 that incorporates focusing optics to collect and focus incident electromagnetic radiation. As in the embodiment of FIG. 3, the microbolometer detector 100 of FIG. 4 includes an encapsulating structure 122 including a cap 126 and a spacer 128 defining the hermetically sealed cavity 124. The encapsulating structure 122 further includes an optical lens or focusing optics 134 formed on or in the cap 126 and configured to focus electromagnetic radiation incident thereon onto the underlying platform 104. In the illustrated embodiment, the optical lens 134 forms a biconvex lens made of an outer convex lens portion 136 formed on the cap substrate 130 and facing away from the underlying platform 104, and an inner convex lens portion 138 formed on the cap passivation layer 132 and facing toward the underlying platform 104.

In some embodiments, non-printing micro-assembly techniques can be used to directly assemble the optical lens 134 on the cap 126, for example with the aid of an automated high-precision alignment system. For instance, crystalline lenses made of germanium or zinc selenide may be used in near-infrared and mid-wavelength infrared applications, while high-resistivity silicon may be used in far-infrared applications. As can be appreciated, other lens materials can be used in other implementations. In other embodiments, the optical lens 134 can be fabricated by inkjet or aerosol jet printing, for example using nanoparticle-based or polymer-based ink formulations. The optical properties of the lens 134 can be adjusted via the chemical composition of the particular ink formulation and the sintering temperature. Furthermore, the radius of curvature and the focal length of the optical lens 134 can be tailored by adjusting the viscosity of the ink formulation, the surface tensions between the lens 134 and the cap 126, and the types of solvents used in the ink formulations.

Figure 5A:
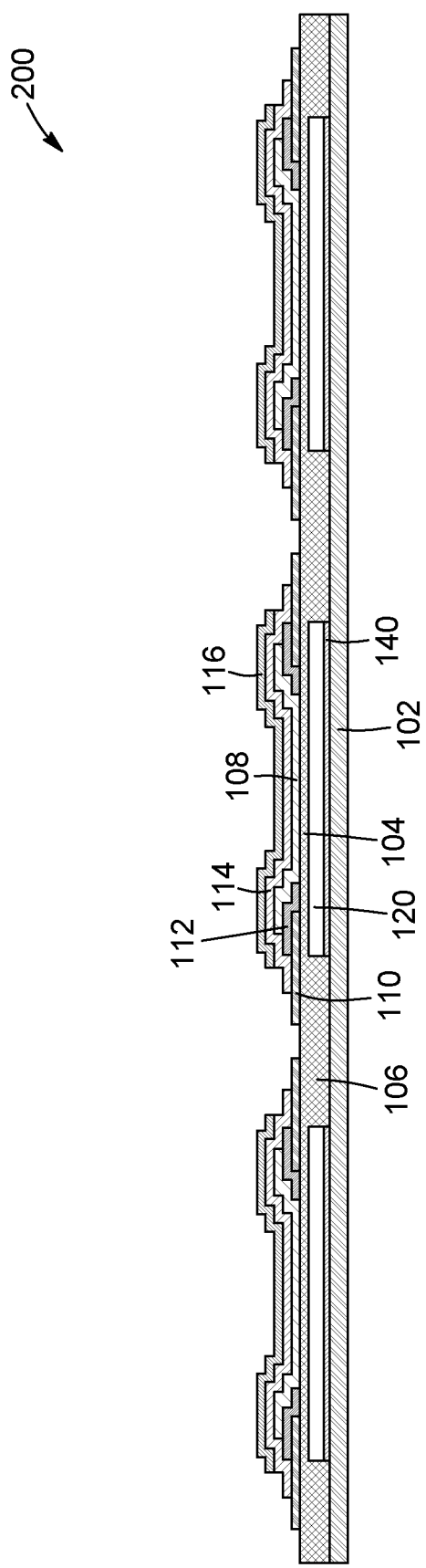
FIG. 5A is a schematic cross-sectional elevation view of a microbolometer array including a plurality of microbolometer detectors arranged in a two-dimensional matrix of rows and columns, in accordance with a possible embodiment.
Figure 5B:
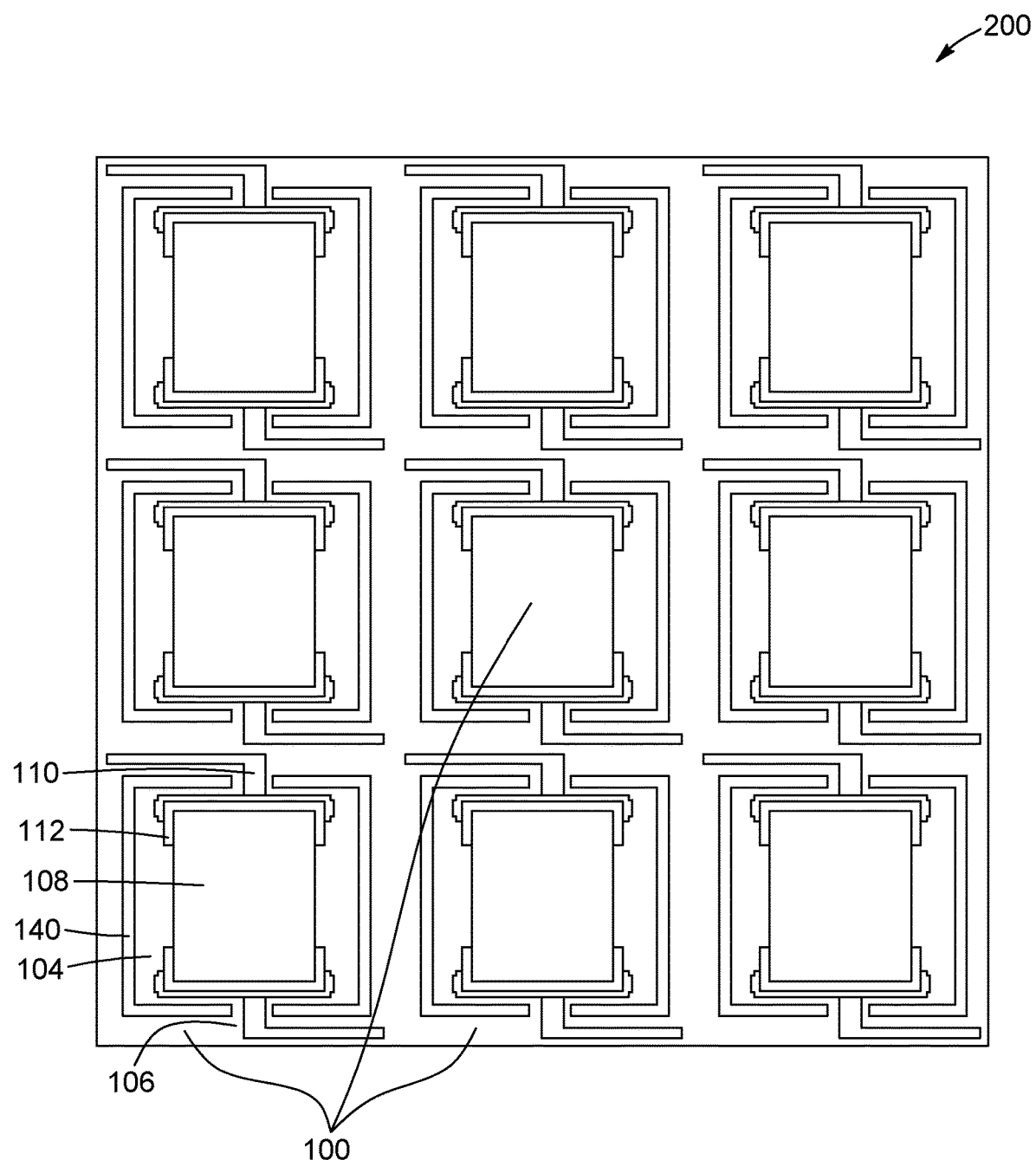
FIG. 5B is a schematic top plan view of the microbolometer array of FIG. 5A.

Referring now to FIGS. 5A and 5B, there is illustrated a microbolometer array 200 that includes a plurality of microbolometer detectors or pixels 100, such as described above, arranged in a two-dimensional matrix of rows and columns. In some implementations, the microbolometer array 200 can be integrated into an uncooled FPA thermal imaging camera or sensor. It is appreciated that while a 3×3 microbolometer array 200 is depicted for clarity, in practice the number of microbolometer detectors 100 in the array 200 will generally be larger, but could also be smaller, depending on the application. For example, in some embodiments, the microbolometer array 200 can include from 40×30 to 1280× 960 pixels, with a pixel pitch ranging between about 500 μm and about 10 mm. It is appreciated that while the microbolometer detectors 100 are arranged to form a two-dimensional array in the embodiment of FIGS. 5A and 5B, they may alternatively be configured as a linear array or be provided at arbitrary locations that do not conform to any specific pattern. Depending on the application, the detectors 100 of the array 200 may or may not be all identical.

Referring to FIGS. 6A to 6C, there are depicted cross-sectional elevation views of microbolometer arrays 200 according to three other possible embodiments. As in the embodiment of FIGS. 5A and 5B, the microbolometer array 200 in each of FIGS. 6A to 6C includes a plurality of arrayed microbolometer detectors 100, each of which generally including a thermistor 108, an electrode structure 110, an ohmic contact layer 112, a passivation layer 114, and a reflector 140. These features can be generally similar to like features described above, and they will not be described again in detail.

In each of FIGS. 6A to 6C, the thermistor 108, the electrode structure 110, the ohmic contact layer 112, and the passivation layer 114 are first printed or otherwise deposited on a flexible substrate which is to become the platform 104 of the resulting microbolometer array 200. Then, the platform 104 with the thermistor 108, electrode structure 110, ohmic contact layer 112, and passivation layer 114 printed thereon is attached, adhered, or otherwise connected to a base assembly 142 that provides the substrate 102 and the support structure 106 of the detectors 100 of the microbolometer array 200.

In FIG. 6A, the base assembly 142 includes a lower base plate 144 and an upper base plate 146. The lower base plate 144 forms the substrate 102 and the lower part of the support structure 106. The lower base plate 144 has a cavity 148 formed therein, at the bottom of which is provided a reflector 140. As can be appreciated, the cavity 148 provides the gap 120 between the substrate 102 and the platform 104 in the resulting microbolometer array 200. Meanwhile, the upper base plate 146 has a through-opening 150 and forms the upper part of the support structure 106. In one embodiment, the lower base plate 144 and the upper base plate 146 can be made of aluminum. In FIG. 6A, the platform 104 with layer components 108, 110, 112, 114 printed thereon is clamped or otherwise retained between the lower base plate 144 and the upper base plate 146, for example by means of clamping screws 152.

In FIGS. 6B and 6C, the base assembly 142 includes a plate-like substrate 102 and a support structure 106 projecting vertically from the substrate 102 to provide a number of post-like or wall-like elements configured to support the platform 104 with layer components 108, 110, 112, 114 printed thereon. For example, the platform 104 can be connected to the support structure 106 of the base assembly 142 by means of an adhesive layer 154 deposited on top of the support structure 106. For example, the adhesive layer 154 can be made of UV-cured or thermally cured epoxy adhesive. In FIG. 6B, the base assembly 142 is made of a rigid or semi-rigid material, for example aluminum, copper, or stainless steel, and the support structure 106 is configured to hold the platform 104 along its outer periphery. In FIG. 6C, the base assembly 142 is made of a flexible material, for example a plastic substrate (e.g., made of PET, PI, PC or PEN) coated with a metallic film, and the support structure 106 is configured to hold the platform 104 both along its outer periphery and at locations closer to its center.

Referring now to FIGS. 7A to 7D, a method for fabricating PEDOT:PSS-based thermistors by inkjet printing on a flexible substrate is represented to illustrate some features of the present techniques.

Figure 7A:
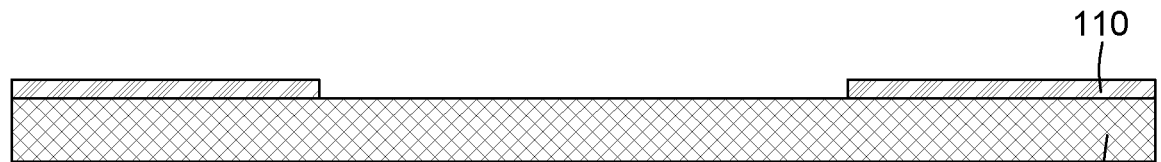
FIGS. 7A to 7D illustrate a printing method for fabricating PEDOT:PSS-based thermistors on a flexible substrate.

Referring to FIG. 7A, a flexible substrate 102 that can be used as a microbolometer substrate or platform is represented with metallic electrodes 110 printed thereon. Various substrates were tested for fabricating printed temperature and infrared detectors, including polyimide (PI), polyethylene terephthalate (PET), polycarbonate (PC), and paper substrates. The choice of the composition of the substrate 102 can be dictated by the surface quality and the processing temperature. For example, polyimide (PI) was found to be advantageous due to its processing temperature of up to 300° C. Such a high processing temperature allows for sintering most ink formulations based on metallic nanoparticles, including ink formulations used to print electrically-conducting components (e.g., the electrodes 110). In some implementations, the step of preparing the substrate 102 can involve a surface activation with oxygen plasma or other wet chemical processes to enhance or control surface tensions prior to printing subsequent layers on the substrate 102.

The metallic electrodes 110 can be printed on the substrate 102 by inkjet, aerosol jet, or other ink-based printing techniques using microparticle-based or nanoparticle-based ink formulations. Samples using a silver-based ink formulation were prepared and tested. In these samples, the ink formulation contained silver nanoparticles having an average particle size of less than 50 nm, a silver nanoparticle loading weight of about 30%, and a viscosity of about 15 cps. The silver nanoparticle-based inks used had relatively low electrical resistivity (i.e., about 4 to about 12 $\Omega \cdot cm$) and sintering temperature (i.e., below 250° C.). A surface treatment of the substrate 102 was carried out prior to printing the silver-based electrode 110 to control splat size (size of inkjet dots) and silver pattern linewidth. Other values of operating parameters used for printing the silver-based electrode structure 110 included a jetting waveform bias voltage of about 35 V, a chuck temperature of about 30° C., and a nozzle temperature of about 28° C. In the studied samples, the printed electrode structure 110 was sintered at about 200° C. for about 60 minutes.

Figure 7B:
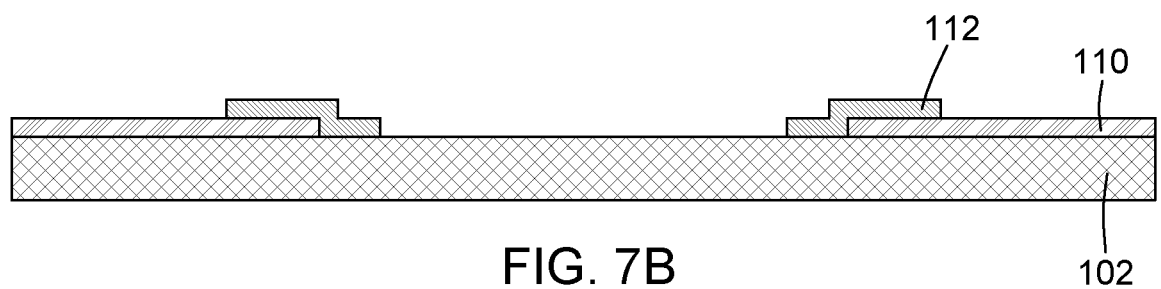
Figure 7C:
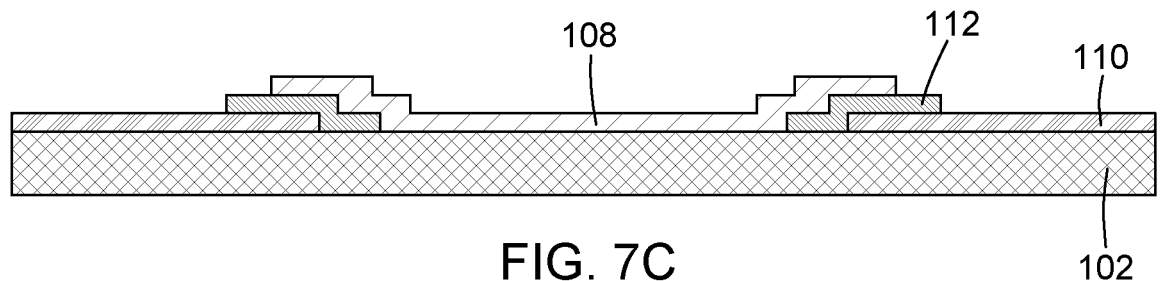

Referring to FIG. 7B, an ohmic contact layer 112 of PEDOT-CNT was printed as an interface layer on part of the silver-based electrode structure 110 to enhance the contact electrical conductance between the electrode structure 110 and the PEDOT:PSS-based thermistor 108 (see FIG. 7C). A water-based ink formulation of PEDOT-CNT containing MWNTs (1.0 to 1.2% loading weight; viscosity of about 5 to 8 cps) was used. If needed, the loading weight and the viscosity of the PEDOT-CNT ink formulation may be adjusted to optimize or control the jetting process and the thickness of the printed ohmic contact layer 112. Other values of operating parameters used during the printing of the ohmic contact layer 112 included a jetting waveform bias voltage of about 45 V, a chuck temperature of about 40° C., and a nozzle temperature of about 28° C. In the studied samples, the printed PEDOT-CNT layer 112 was cured with infrared radiation and subsequently baked at about 125° C. for 30 minutes.

Referring to FIG. 7C, the next step included inkjet printing of a PEDOT:PSS thermistor film 108 using an aqueous dispersion with about 1.0 to 1.2% solid content and a viscosity in the range of about 8 to about 30 cps. The resistivity of the printed PEDOT:PSS thermistor film 108 could be varied between about 1 to 20 $\Omega \cdot cm$ by adjusting the concentration of PSS in the ink formulation. In the studied samples, a satisfactory jetting of the PEDOT:PSS ink formulation was achieved at a bias voltage of about 45 V, a chuck temperature of about 40° C., and a nozzle temperature of about 28° C. The printed PEDOT:PSS film 108 was cured with infrared radiation and subsequently baked at 125° C. for 30 minutes.

Figure 7D:
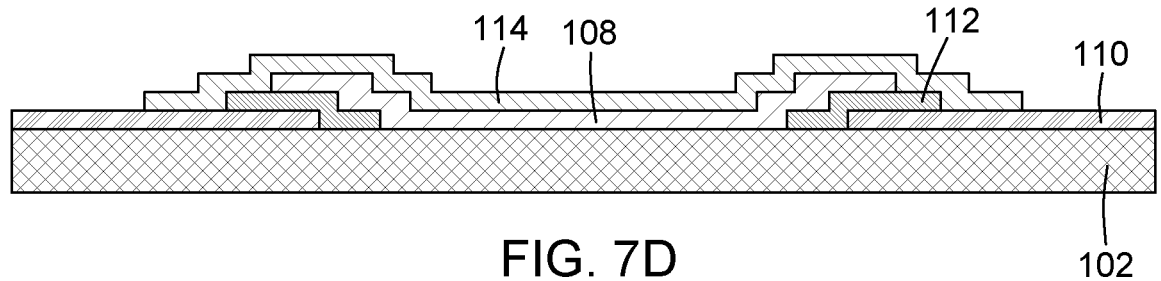

Referring to FIG. 7D, a SU-8 photoresist layer 114 was printed over the samples as a passivation layer. SU-8 is an epoxy-based photopolymer commonly used as a dielectric and passivation layer. SU-8 becomes crosslinked when exposed to ultraviolet radiation. SU-8 has a high chemical resistance, high thermal stability, and low Young's modulus. These characteristics can make SU-8 a suitable conformal coating layer for printed devices. In the studied samples, SU-8 was inkjet printed at a bias voltage of about 45 V, a chuck temperature of about 40° C., and a nozzle temperature of about 30° C. Depending on the sample, the printed SU-8 film 114 was cured with ultraviolet and infrared radiation, or in an oven at a temperature below 150° C.

Figure 8A:
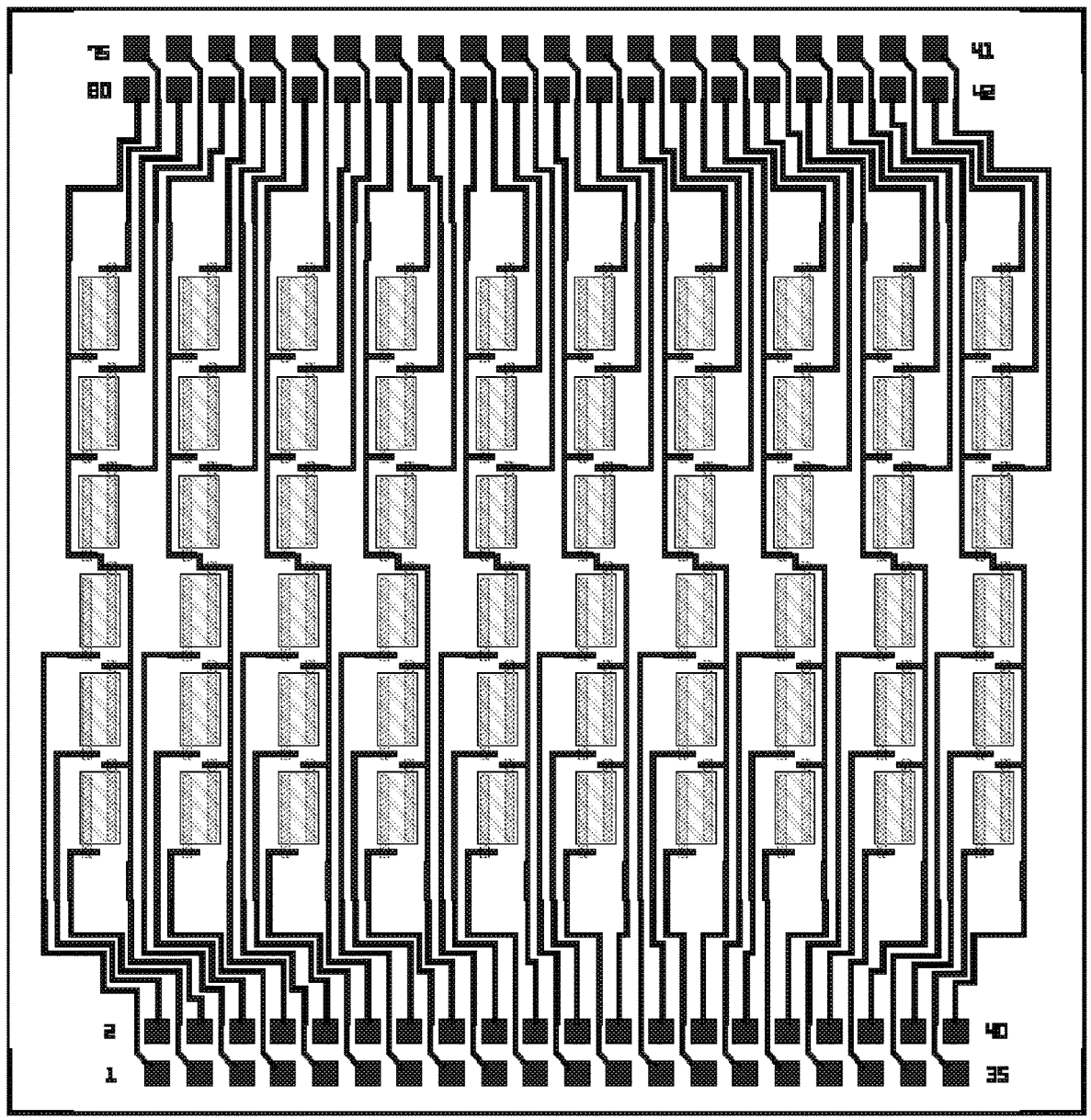
FIG. 8A is a schematic representation of a 6×10 array of microbolometer detectors including PEDOT:PSS thermistors, a passivation layer, and silver-based electrical interconnections, printed on a flexible polyimide (PI) substrate using the present techniques.
Figure 8B:
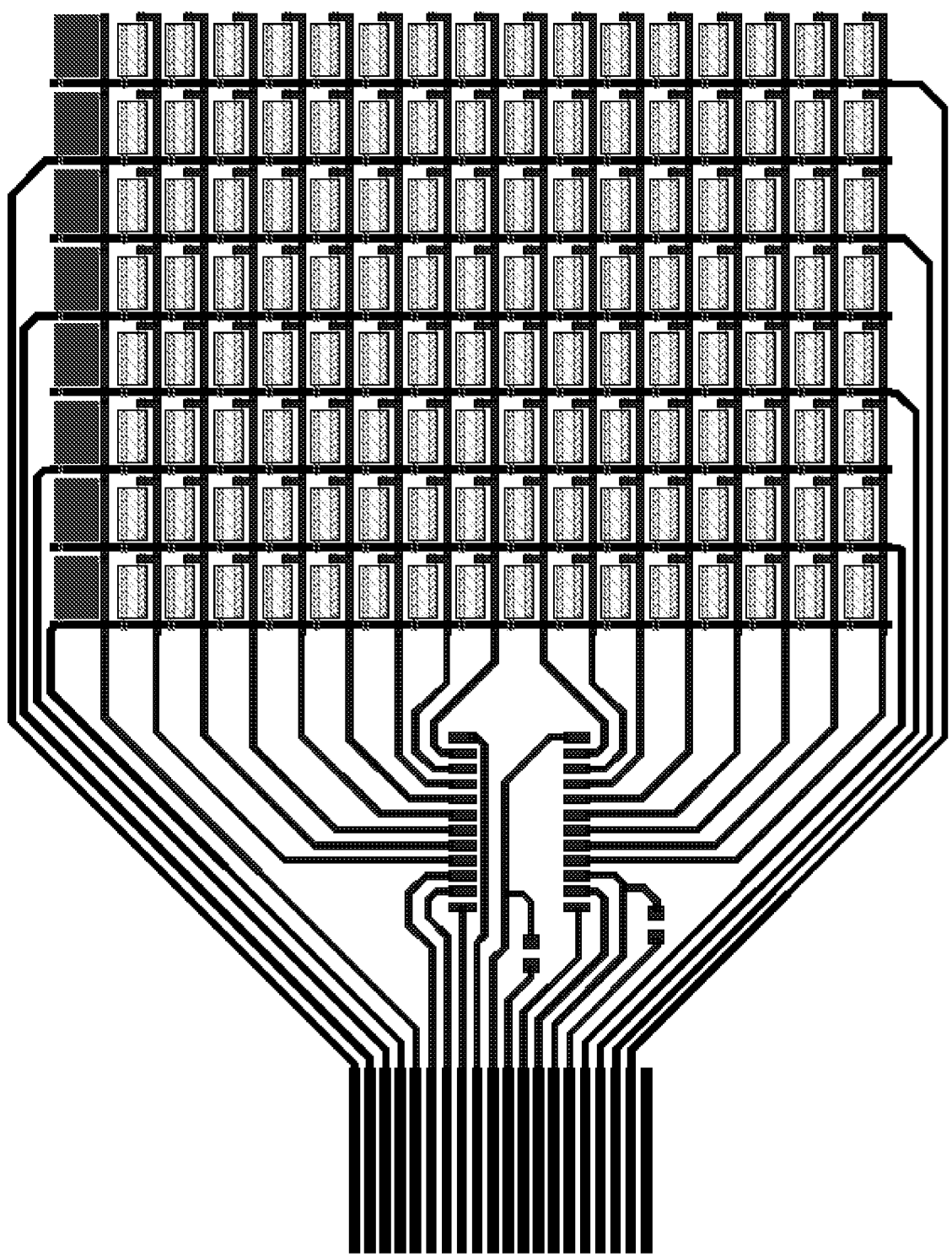
FIG. 8B is a schematic representation of an 8×16 array of microbolometer detectors including multiplexed PEDOT:PSS thermistors printed on a flexible PI substrate using the present techniques.

For simplicity, FIGS. 7A to 7D illustrate steps of the fabrication of an individual detector. However, arrays of such detector were also fabricated. An example is shown in FIG. 8A, which is a schematic representation of a 6×10 microbolometer detector array that was fabricated using PEDOT:PSS thermistors, a SU-8 passivation layer, and silver-based electrical interconnections printed on a flexible PI substrate. Another example is shown in FIG. 8B, which is a schematic representation of an 8×16 array of microbolometer detectors including multiplexed PEDOT:PSS thermistors fabricated on a flexible PI substrate using inkjet printing of multilayer thin-film structures. In this example, multiplexing of the thermistors was achieved by hybrid integration of a multiplexing circuit and passive components on the flexible PI substrate using a flip-chip bonding assembly process. Readout of the array was achieved via a flexible flat cable connected to a data acquisition and processing unit. Preliminary characterization results indicated that a noise-equivalent temperature difference below 1 kelvin can be achieved with proper thermal isolation of the thermistors and compensation of ambient temperature drift.

Figure 9:
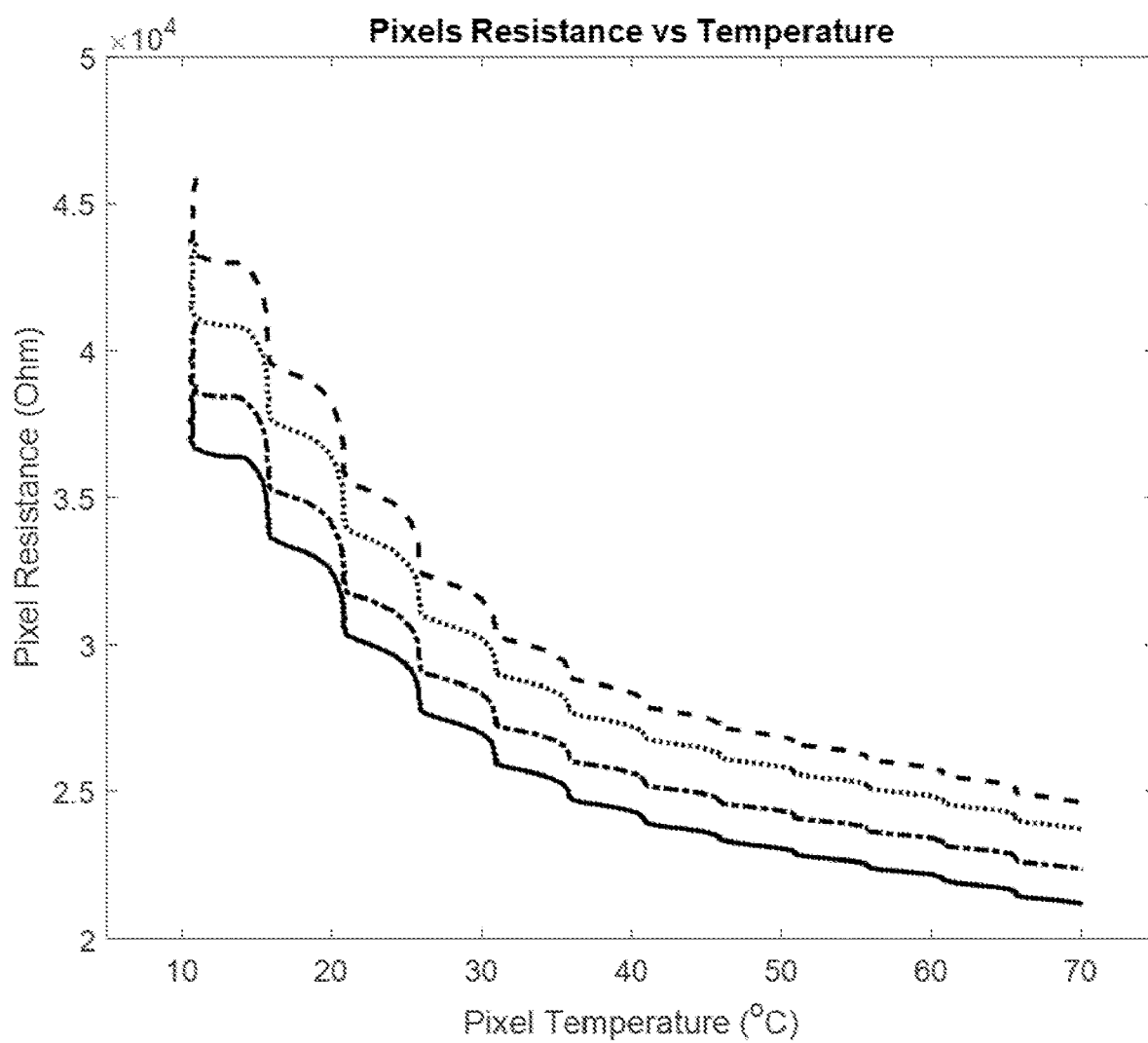
FIG. 9 depicts temperature-dependent electrical resistance measurements performed on an array of PEDOT:PSS-based microbolometer detectors corresponding to the one depicted in FIG. 8A. Each curve in FIG. 9 depicts the resistance of the PEDOT:PSS thin-film thermistor measured on a different detector of the microbolometer array as a function of the detector temperature and under a bias current of 10 µA.

Referring to FIG. 9, electrical resistance measurements as functions of temperature were performed on a 6×10 array of PEDOT:PSS-based microbolometer detector pixels corresponding to the array depicted in FIG. 8A. The measurements were carried out in an environmental chamber inside which the temperature was gradually increased from 10° C. to 70° C. by 5° C. increments. During the measurements, the microbolometer array was suspended above a cavity machined in an aluminum plate, such as illustrated in FIG. 6A, in order to minimize heat losses due to thermal conductance between the PI substrate and the supporting material. The detector array was electrically connected using an array of spring-loaded pogo pins mounted on a PC plate disposed over the microbolometer array. The pogo pins were aligned on top of the connection pads to achieve direct electrical contact. Each one of the four curves in FIG. 9 represents the measured resistance of the PEDOT:PSS thin-film thermistor of one of four different detector pixels of the microbolometer array, plotted as a function of temperature and under a bias current of 10 $\mu A$. The measured resistance of the PEDOT:PSS thin-film thermistors exhibited an exponential decrease as a function of temperature, which is a common characteristic of a bolometric material with a negative TCR.

Figure 10:
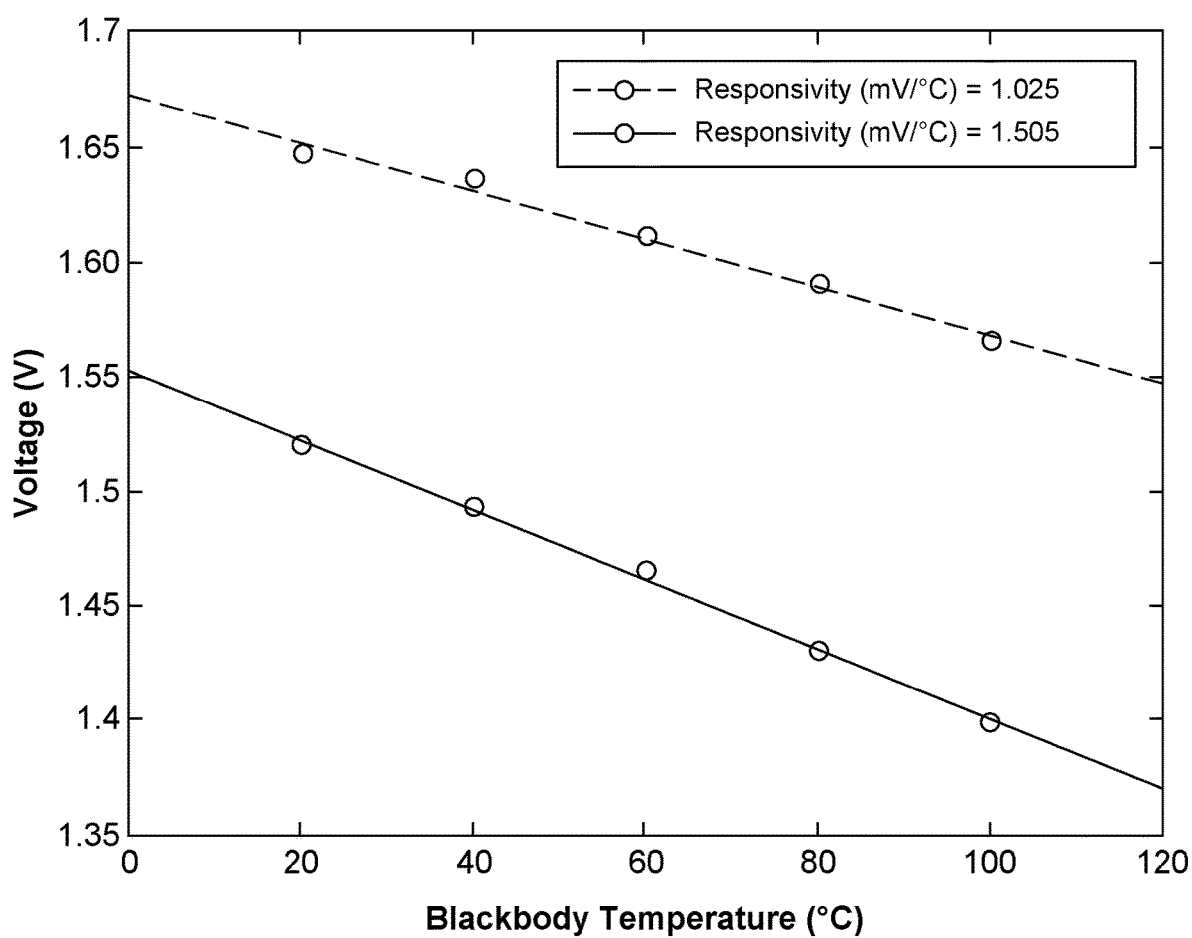
FIG. 10 is a graph showing curves of the terminal voltages of the thermistors of two different PEDOT:PSS-based microbolometer detectors, measured as functions of the temperature of a blackbody to which the detectors were exposed. The slope of each curve represents the responsivity of each microbolometer detector.

FIG. 10 is a graph showing curves of the terminal voltages of the thermistors of two different PEDOT:PSS-based microbolometer detectors, or pixels, measured as functions of the temperature of a blackbody to which the detectors were exposed. The slope of each curve represents the responsivity of each microbolometer detector. The microbolometer detectors were fabricated as described above with respect to FIGS. 7A to 7D. The detectors differed from each other with respect to the dimensions, and thus the resistance, of their PEDOT:PSS-based thermistor. As can be seen from FIG. 10, responsivities of more than 1 mV/° C. (in absolute value) were observed, thus providing an indication of the sensitivity of the detectors to temperature variations present in an observable scene.

Of course, numerous modifications could be made to the embodiments described above without departing from the scope of the appended claims.

The invention claimed is:

1. A microbolometer detector, comprising:
   a substrate;

a platform suspended above the substrate;
a thermistor printed on the platform and made of a thermistor material comprising an electrically conducting polymer;
an electrode structure printed on the platform and electrically connected to the thermistor; and
an ohmic contact layer interposed between the thermistor and the electrode structure, wherein the ohmic contact layer is made of an ohmic contact material comprising an electrically conducting polymeric composition.

2. The microbolometer detector of claim 1, wherein the substrate, the platform, or both the substrate and the platform are made of a flexible material.

3. The microbolometer detector of claim 2, wherein the flexible material comprises a polymeric composition.

4. The microbolometer detector of claim 1, wherein the electrically conducting polymer comprises poly(3,4-ethylenedioxythiophene) (PEDOT).

5. The microbolometer detector of claim 4, wherein the electrically conducting polymer comprises a PEDOT-based copolymer.

6. The microbolometer detector of claim 5, wherein the PEDOT-based copolymer comprises poly(3,4-ethylenedioxythiophene) polystyrene sulfonate (PEDOT:PSS).

7. The microbolometer detector of claim 1, wherein the thermistor is printed on the platform by inkjet printing, aerosol jet printing, screen printing, or roll-to-roll printing.

8. The microbolometer detector of claim 1, wherein the electrode structure is made of an electrode material comprising silver, copper, gold, aluminum, carbon, a metal composite, an electrically conducting metal oxide, or any combination thereof.

9. The microbolometer detector of claim 1, wherein the electrically conducting polymeric composition comprises a PEDOT-based polymeric composition.

10. The microbolometer detector of claim 9, wherein the PEDOT-based polymeric composition comprises PEDOT and a carbon-based nanomaterial.

11. The microbolometer detector of claim 10, wherein the carbon-based nanomaterial comprises carbon nanotubes.

12. The microbolometer detector of claim 1, further comprising an optical absorber disposed over and in thermal contact with the thermistor.

13. The microbolometer detector of claim 1, further comprising an encapsulating structure formed on the platform and defining a cavity encapsulating the thermistor.

14. The microbolometer detector of claim 13, wherein the encapsulating structure comprises a cap supported above the platform in a spaced relationship therewith, and a spacer supporting the cap.

15. The microbolometer detector of claim 13, wherein the encapsulating structure comprises an optical lens mounted thereon to focus electromagnetic radiation incident thereon onto the platform.

16. A microbolometer array comprising a plurality of microbolometer detectors in accordance with claim 1.

17. A microbolometer detector, comprising:
a flexible substrate;
a platform suspended above the flexible substrate;
a thermistor printed on the platform and made of a thermistor material comprising a poly(3,4-ethylenedioxythiophene) polystyrene sulfonate (PEDOT:PSS) polymeric composition;
an electrode structure printed on the platform, the electrode structure being electrically connected to the thermistor and made of an electrode material comprising silver; and
an ohmic contact layer interposed between the thermistor and the electrode structure and made of an ohmic contact material comprising a PEDOT-carbon nanotube polymeric composition.

18. A microbolometer array comprising a plurality of microbolometer detectors in accordance with claim 17.

19. A microbolometer detector, comprising:
a substrate;
a platform suspended above the substrate;
a thermistor printed on the platform and made of a thermistor material comprising an electrically conducting polymer; and
an encapsulating structure formed on the platform and defining a cavity encapsulating the thermistor.

20. The microbolometer detector of claim 19, wherein the encapsulating structure comprises an optical lens mounted thereon to focus electromagnetic radiation incident thereon onto the platform.

21. A microbolometer array comprising a plurality of microbolometer detectors in accordance with claim 19.

* * * * *